(12) United States Patent
Gutknecht et al.

(10) Patent No.: US 7,572,473 B2
(45) Date of Patent: *Aug. 11, 2009

(54) PROCESS FOR MAKING YOGURT CREAM CHEESE, AND THE RESULTING PRODUCTS

(75) Inventors: Jon R. Gutknecht, South Burlington, VT (US); John B. Ovitt, Franklin, VT (US)

(73) Assignee: Franklin Foods, Inc., Enosburg Falls, VT (US)

( * ) Notice: Subject to any disclaimer, the term of this patent is extended or adjusted under 35 U.S.C. 154(b) by 499 days.

This patent is subject to a terminal disclaimer.

(21) Appl. No.: 11/006,918

(22) Filed: Dec. 8, 2004

(65) Prior Publication Data

US 2005/0084565 A1 Apr. 21, 2005

Related U.S. Application Data

(63) Continuation-in-part of application No. PCT/US2004/002538, filed on Jan. 29, 2004, and a continuation-in-part of application No. 10/369,163, filed on Feb. 19, 2003, now Pat. No. 7,083,815.

(51) Int. Cl.
A23C 19/00 (2006.01)

(52) U.S. Cl. ................. 426/582; 426/34; 426/580; 426/583

(58) Field of Classification Search ........... 426/34, 426/519, 520, 521, 580, 582, 583
See application file for complete search history.

(56) References Cited

U.S. PATENT DOCUMENTS

| | | |
|---|---|---|
| 3,749,583 A | 7/1973 | Cox et al. ............. 99/59 |
| 3,929,892 A | 12/1975 | Hynes et al. |
| 4,110,476 A | 8/1978 | Rhodes |
| 4,293,573 A | 10/1981 | Bradley, Jr. et al. |
| 4,410,549 A | 10/1983 | Baker |
| 4,434,184 A | 2/1984 | Kharrazi |
| 4,724,152 A | 2/1988 | Baker et al. |
| 4,749,584 A | 6/1988 | Wirchanshy et al. |
| 4,837,035 A | 6/1989 | Baker et al. |
| 4,837,036 A | 6/1989 | Baker et al. |
| 4,952,414 A | 8/1990 | Kaufman et al. |
| 4,956,186 A | 9/1990 | Streiff et al. |
| 4,968,512 A | 11/1990 | Kharrazi |
| 5,079,024 A | 1/1992 | Crane |
| 5,180,604 A | 1/1993 | Crane et al. |
| 5,252,352 A | 10/1993 | Banach et al. |
| 5,356,639 A | 10/1994 | Jameson et al. |
| 5,378,478 A | 1/1995 | Miller et al. |
| 5,395,631 A | 3/1995 | Sweeney |
| 5,449,523 A | 9/1995 | Hansen et al. |
| 5,520,948 A | 5/1996 | Kvamme |
| 5,676,984 A | 10/1997 | Bohanan et al. |
| 5,679,396 A | 10/1997 | Finnocchiaro |
| 5,820,903 A | 10/1998 | Fleury et al. |
| 5,846,592 A | 12/1998 | Alderliesten et al. |
| 5,882,704 A | 3/1999 | Yamaguchi et al. |
| 6,025,008 A | 2/2000 | Akahoshi et al. |
| 6,096,352 A | 8/2000 | Kijowski et al. |
| 6,136,351 A | 10/2000 | Nauth et al. |
| 6,183,802 B1 | 2/2001 | Silva et al. |
| 6,365,205 B1 | 4/2002 | Wahlgren |
| 6,406,736 B1 | 6/2002 | Han |
| 6,416,797 B1 | 7/2002 | Han et al. |
| 6,419,974 B1 | 7/2002 | Silva et al. |
| 6,544,567 B1 | 4/2003 | Davis et al. |
| 7,083,815 B2 * | 8/2006 | Gutknecht et al. ......... 426/36 |
| 7,258,886 B2 * | 8/2007 | Brue et al. ............. 426/582 |
| 2002/0068112 A1 | 6/2002 | Murphy et al. |
| 2003/0031758 A1 | 2/2003 | Koss et al. |
| 2006/0068075 A1 | 3/2006 | Fultz et al. |

OTHER PUBLICATIONS

Tamime, A.Y. et al., "Yoghurt—Science and Technology" (Pergamon Press 1985), p. 250.

Newlander, C.E., "The Babcock Test: Notes on its Use in Determining TM Percentage of Fat in Whole Milk, Skim-Milk, Buttermilk, Cream and Whey," Bulletin No. 2, Extension Series, Mar. 1916, pp. 1-11, Publisher: Michigan Agricultural College, Extension Division.

U.S. Food & Drug Administration, Grade "A" Pasteurized Milk Ordinance, 2001 Revision.

Waukesha Cherry-Burrell, Votator Scraped Surface Heat Exchangers, 2001.

Zubillaga, M. et al., "Effect of probiotics and functional foods and their use in different diseases", Nutrition Research, vol. 21, pp. 569-579 (Elsevier Science Inc. 2001).

(Continued)

Primary Examiner—Leslie Wong
(74) Attorney, Agent, or Firm—Jay M. Brown

(57) ABSTRACT

Techniques for making a yogurt cream cheese product comprising steps of providing a milkfat fluid comprising butterfat; pasteurizing the milkfat fluid to produce a cream cheese precursor; providing a yogurt, and combining the yogurt with the cream cheese precursor to produce a combined precursor; and homogenizing and acidifying the combined precursor; wherein the acidification is completed within about three hours following production of the combined precursor; producing a yogurt cream cheese product. Techniques wherein the combined precursor is cooled to retard bacteria activity prior to the acidifying. Techniques for making a whipped yogurt cream cheese product. Yogurt cream cheese products produced by the processes.

49 Claims, 2 Drawing Sheets

OTHER PUBLICATIONS

Roberfroid, Marcel B., et al., "The Bifidogenic Nature of Chicory Inulin and its Hydrolysis Products", Journal of Nutrition, vol. 128, No. 1, pp. 11-19 (American Society for Nutritional Sciences, Jan. 1998).

U.S. Appl. No. 11/453,941, filed Jun. 15, 2006, Gutknecht et al.
U.S. Appl. No. 11/454,756, filed Jun. 16, 2006, Gutknecht et al.

* cited by examiner

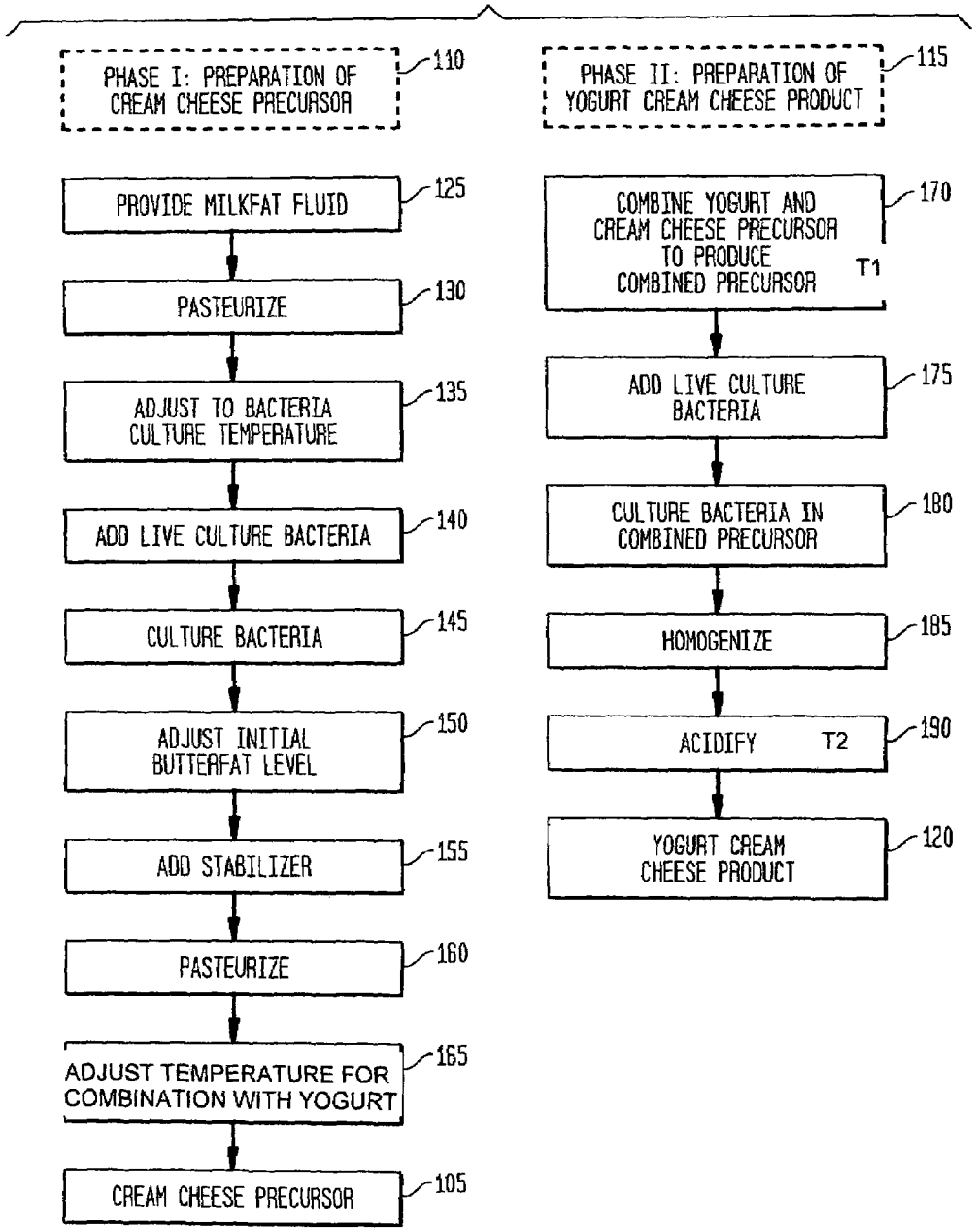

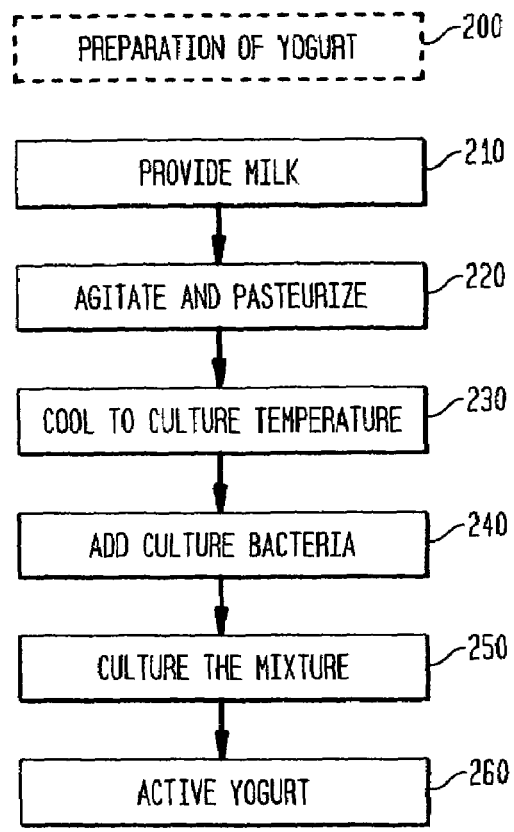
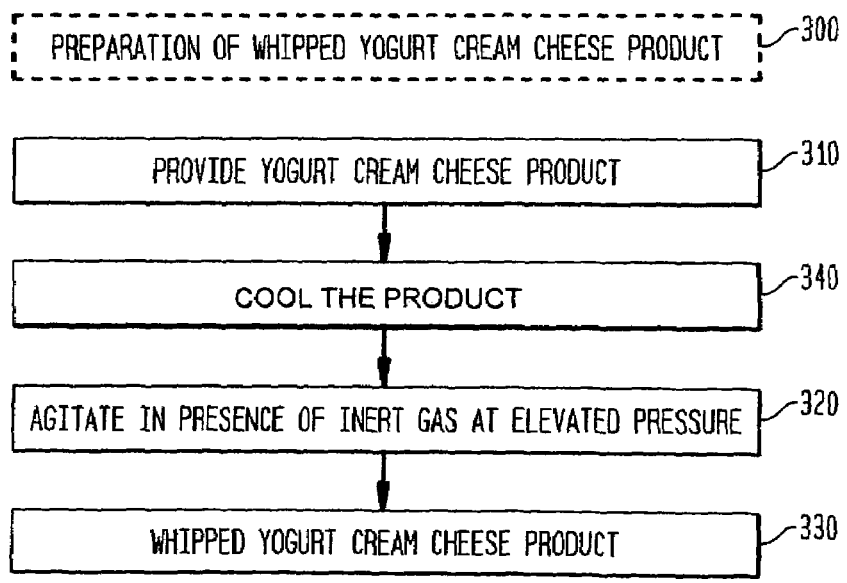

PROCESS FOR MAKING YOGURT CREAM CHEESE, AND THE RESULTING PRODUCTS

This application is a continuation in part of commonly owned U.S. patent application Ser. No. 10/369,163, filed on Feb. 19, 2003, now U.S. Pat. No. 7,083,815, and a continuation in part of PCT/US04/02538 filed Jan. 29, 2004.

FIELD OF THE INVENTION

The present invention relates to the field of processes for making cream cheeses, and the resulting products. More particularly, the present invention relates to processes for making yogurt cream cheese products that comprise yogurt and retain whey from milkfat fluid used to make the products. These yogurt cream cheese products combine the desirable texture and mouth feel of cream cheese, having a dramatically improved flavor due to retained whey, with the additionally desirable taste and active culture bacteria health benefits of yogurt.

BACKGROUND OF THE INVENTION

Cream cheese products are ubiquitous in modern diets. They generally have a smooth texture and a bland, unremarkable flavor. Spreadability makes cream cheese convenient to use, which is the primary basis for its choice by consumers over other firmer cheeses and the reason for its high volume consumption as a topping, for example on breads including bagels. In the classic method for making cream cheese, a pasteurized milkfat fluid such as cream, having a butterfat content generally within a range of between about 34.5% by weight and 50% by weight, is the primary raw material. This milkfat fluid is subjected to thorough digestion by lactic acid-producing bacteria, homogenized, and clotted by enzymes or direct acidification. The milkfat fluid is thus transformed into a solid phase referred to as the curd, and a liquid phase referred to as the whey. Most of the butterfat content of the milkfat fluid is retained in the curd; and significant protein content, having nutritional value and much of the desirable potential flavor, remains in the whey. At such a point, the curd is further processed into the desired cream cheese product, and the whey is discarded, along with its flavor. As a result, cream cheese typically has a bland, dull, virtually unnoticeable taste. The retention of liquid whey in the curd is a problem in itself, as the liquid gradually leaks out of the curd in an unappealing and ongoing separation that is called syneresis. In addition, large scale cream cheese production generates corresponding quantities of often unusable whey, which thus becomes a waste expense and environmental detraction unless some other use can be found for it.

The minimum butterfat content for cream cheese is 33% by weight. It is a pervasive goal in the human diet to consume less fat; and the relatively high butterfat content of a typical cream cheese is not helpful in achieving this goal. Countless attempts have been made to make low-fat cream cheese products, but the resulting cheese products have failed due to unacceptable taste and poor texture.

Yogurt, another highly prevalent milk-derived product, has an entirely different consistency than cream cheese, as well as a fundamentally different flavor. In illustration, yogurt is considered to be a food, whereas cream cheese is considered to be a condiment. For example, yogurt, unlike cream cheese, is not a popular topping for bread products such as bagels. On the other hand, yogurt has a robust, desirable flavor. Yogurt also is typically lower than cream cheese in butterfat, cholesterol and sodium, and higher in protein.

A health-conscious consumer might well make the simple observation that nonfat yogurt has a robust, desirable flavor, find the concept of combining yogurt and cream cheese to be desirable, and thus attempt to combine these products together. However, due to the disparate properties of cream cheese and yogurt, including for example their differing consistencies, water content, and food chemistries, the combination of cream cheese and yogurt in mutually appreciable proportions only generates a runny mess. A consumer might then attempt to drain the liquid from the solid phase of the yogurt before combining in the cream cheese, thereby discarding whey from the yogurt.

Producing a cream cheese having an appealing consistency and utility, for example as a spreadable topping, is not possible by mixing cream cheese and yogurt without also adulterating these ingredients either by discarding whey from the yogurt or cream cheese, or by adding substantial proportions of gums and processed milk byproducts such as milk protein concentrate, whole milk protein, whey protein concentrate, casein, Baker's cheese, yogurt powder, and dry cottage cheese curd. At that point, the product is no longer cream cheese but a processed cheese spread, typically having inferior texture and nutritional value, and a flavor that is either bland or even mildly unpleasant. Efforts have also been made to produce so-called low-fat cream cheese, but again the resulting product has offered a bland, unremarkable and potentially unpleasant flavor. Hence, despite the broad popularity of cream cheese, its use typically entails consumer acceptance of a minimum butterfat content of 33% by weight, along with high cholesterol and sodium, and a bland, unremarkable taste.

Accordingly it would be highly desirable to provide a process for making an improved cream cheese product from a milkfat fluid, having the consistency of high-milkfat cream cheese but combining the desirable flavor and nutritional benefits of yogurt with the flavor of whey retained from the milkfat fluid, yielding a robust taste. The resulting yogurt cream cheese product would be a welcome substitute for its faintly-tasting high-fat progenitor while simultaneously improving cream cheese production economics and protecting the environment. Since the butterfat content of yogurt is typically within a range of between about 0% and about 3.25% by weight, and commonly less than about 0.5% by weight, the combination of yogurt into a cream cheese product also would desirably yield a cream cheese having a lower overall butterfat content and a relatively higher protein content. Cholesterol accompanies butterfat, so that the cholesterol content of this product would also be reduced.

SUMMARY OF THE INVENTION

In one embodiment according to the present invention, a process is provided for making a yogurt cream cheese product comprising steps of: providing a milkfat fluid comprising butterfat; pasteurizing said milkfat fluid to produce a cream cheese precursor; providing a yogurt, and combining said yogurt with said cream cheese precursor to produce a combined precursor; and homogenizing and acidifying said combined precursor; wherein said acidification is completed within about three hours following production of said combined precursor; producing a yogurt cream cheese product.

In another embodiment according to the present invention, a process is provided for making a yogurt cream cheese product comprising steps of: providing a milkfat fluid comprising butterfat; pasteurizing said milkfat fluid to produce a cream cheese precursor; providing a yogurt, and combining said yogurt with said cream cheese precursor to produce a combined precursor; and homogenizing and acidifying said combined precursor; wherein said combined precursor is cooled to retard bacteria activity prior to said acidifying; producing a yogurt cream cheese product.

In a further embodiment according to the present invention, a process is provided for making a whipped yogurt cream cheese product comprising steps of: providing a milkfat fluid comprising butterfat; pasteurizing said milkfat fluid to produce a cream cheese precursor; providing a yogurt, and combining said yogurt with said cream cheese precursor to produce a combined precursor; homogenizing and acidifying said combined precursor to produce a yogurt cream cheese product; injecting an inert gas into said yogurt cream cheese product, and cooling said yogurt cream cheese product to an inert gas injection temperature prior to said injecting; and agitating said yogurt cream cheese product in the presence of said inert gas at an elevated pressure; producing a whipped yogurt cream cheese product.

In additional embodiments according to the present invention, yogurt cream cheese products produced according to processes of the present invention are provided.

A more complete understanding of the present invention, as well as other features and advantages of the present invention, will be apparent from the following detailed description and the accompanying drawings.

BRIEF DESCRIPTION OF THE DRAWINGS

FIG. 1 is a flow chart of an exemplary process for making a yogurt cream cheese product according to the present invention;

FIG. 2 is a flow chart of an exemplary process for making yogurt for incorporation as an ingredient in the process according to FIG. 1; and FIG. 3 is a flow chart of an exemplary process for making a whipped yogurt cream cheese product.

DETAILED DESCRIPTION

Referring to FIG. 1, a flow chart of an exemplary process 100 is shown for making a yogurt cream cheese product according to the present invention. According to this process, a cream cheese precursor 105 is produced in phase I generally indicated at 110. Subsequent steps defined in phase II generally indicated at 115 result in production of a yogurt cream cheese product 120.

Phase 1 of process 100 begins with provision of a milkfat fluid at step 125. By milkfat is meant a composition comprising the fatty components of edible milk, for example, cow milk. Such fatty components, commonly referred to collectively as butterfat, can include, for example, triacylglycerols, diglycerides, monoacylglycerols, and other lipids. By fluid is meant a liquefied composition comprising milkfat, which can either be directly derived from milk, or reconstituted by hydrating a dehydrated milk product. For example, the milkfat fluid can be cream. The milkfat fluid can be formed from a mixture of sources, including, for example, whole milk, cream, skim milk, and dry milk.

In one embodiment according to the present invention, the milkfat fluid has a butterfat content within a range of between about 10% and about 50% by weight. In another embodiment according to the present invention, the milkfat fluid has a butterfat content within a range of between about 33% and about 50% by weight, suitable for preparation of a yogurt cream cheese. In a further embodiment according to the present invention, the milkfat fluid has a butterfat content within a range of between about 39% and about 50% by weight. In another embodiment according to the present invention, the milkfat fluid has a butterfat content within a range of between about 40% and about 44% by weight. In yet another embodiment according to the present invention, the milkfat fluid has a butterfat content within a range of between about 17% and about 33% by weight, suitable for preparation of a yogurt neufchatel cheese. Although much of the ensuing discussion is addressed to embodiments according to the present invention for preparation of a yogurt cream cheese product having a butterfat content within a range of between about 33% and about 50% by weight, it will be understood that the teachings according to the present invention may be applied to production of a yogurt neufchatel product having a butterfat content within a range of between about 17% and about 33% by weight, or to production of a yogurt light cream cheese product having a butterfat content within a range of between about 10% and about 17% by weight. The term yogurt cream cheese product as used herein therefore generally refers broadly to all of such products.

In an additional embodiment according to the present invention, the milkfat fluid has a water content within a range of between about 50% and about 60% by weight. For example, heavy cream may have a butterfat content of about 37% by weight, a protein content of about 2% by weight, and a water content of about 58% by weight, with the balance made up by other milk solids. Butterfat is an essential ingredient in cheese, as the butterfat is coagulated together with proteins and other elements into a curd and further processed to produce the cheese.

In a further embodiment according to the present invention, the milkfat fluid is pasteurized at step 130. Prior to this step, the milkfat fluid typically carries the wild bacteria load normally present in raw milk products. Pasteurization of the milkfat fluid is required at some point in order to kill these undesirable bacteria, as well as other undesired microbes, to the extent reasonably feasible. Furthermore, if the milkfat fluid is to be subjected to culture bacteria in steps 140-145 or steps 175-180 discussed below, pasteurization needs to be completed in advance of those steps or the wild bacteria in the raw milkfat fluid will typically digest and thereby spoil the product. Where a source of pre-pasteurized milkfat fluid is employed, further pasteurization at this point may be unnecessary.

Pasteurization causes irreversible heat-induced denaturation and deactivation of bacteria. Effective pasteurization is a function of both time and temperature; pasteurization can be completed at higher temperatures in correspondingly shorter times. In one embodiment according to the present invention, pasteurization of the milkfat fluid in step 130 is carried out in a vat process at a temperature of about 150° Fahrenheit ("F") for about 30 minutes; or about 165° F. for about 15 minutes; or if a more strenuous process is desired, about 170° F. for about 30 minutes. Other effective time and temperature treatment parameters are known; and substitution of high surface area contact methods for the vat process can permit shorter effective treatment times. High temperature short time pasteurization for example, in which the milkfat fluid is pumped through an in-line tube within a temperature-controlled shell, can be used. Milkfat fluids having relatively high butterfat content generally require more heat exposure than low butterfat fluids in order to obtain effective pasteurization. Further background information on pasteurization of milk is provided in the Grade "A" Pasteurized Milk Ordinance published on May 15, 2002 by the U.S. Food & Drug Administration, particularly at pages 62 and 63; the entirety of which is hereby incorporated herein by reference.

Agitation is preferably provided and initiated prior to the heating process during pasteurization to facilitate even heating throughout the milkfat fluid and to avoid localized overheating. The force applied by the agitation should not be so strong as to substantially shear and thus degrade the proteins and butterfat in the milkfat fluid. Desirably, pasteurization is carried out in a tank equipped with a heater and agitator. Any suitable vessel can be used, such as, for example, a Groen kettle.

According to one embodiment of the present invention, the temperature of the milkfat fluid is adjusted at step 135 to a bacteria culture temperature. In another embodiment according to the present invention, the temperature of the milkfat fluid is adjusted to within a range of between about 65° F. and about 92° F. In an additional embodiment according to the present invention, the temperature of the milkfat fluid is adjusted to within a range of between about 70° F. and about 85° F. In yet a further embodiment according to the present invention, the temperature of the milkfat fluid is adjusted to about 82° F.

In one embodiment according to the present invention, culture bacteria are added to the milkfat fluid at step 140, and then cultured at step 145. The purpose of these steps is to generate robust culture-induced flavor in the milkfat fluid. Milk contains lactose sugars that can be digested by selected bacteria, producing lactic acid, glucose and galactose as metabolites. Hence, the culture bacteria generally are selected from among those that can digest lactose. Preferably, a strain of mesophilic bacteria suitable for culturing cream cheese is used. Such bacteria strains are typically chosen to produce diacetyl flavor. Bacteria strains may require ongoing rotational use, to prevent background bacteriophage populations from becoming resistant to a particular strain of bacteria, which can result in shutdown of the culture process and contamination of the product in production. For example, the culture bacteria may be selected from varying combinations of strains, preferably rotated on an ongoing basis, of (1) lactic acid—producing *Lactococcus lactis* subspecies *lactis* or subspecies *cremoris;* and (2) diacetyl flavor—producing *Lactococcus lactis* subspecies *diacetylactis* or *Leuconostoc* strains. Suitable bacteria strains are commercially available under the trade name pHage Control™ from Chr. Hansen, Bøge Allé 10-12, DK-2970 Hørsholm, Denmark. Grades 604 and 608 are particularly effective. These particular bacteria strain blends can be used continuously without rotation, provided that proper sanitation is maintained. Further suitable bacteria strains are commercially available under the trade names Flav Direct™ and DG™ Cultures from Degussa BioActives, 620 Progress Avenue, P.O. Box 1609, Waukesha, Wis. 53187-1609.

Once a culture bacteria strain or strain mixture is selected, an amount is added to a given batch of milkfat fluid that is effective to propagate live cultures throughout the batch in a reasonable time at the chosen culture temperature. For example, 500 grams of bacteria may be effective to inoculate up to 7,500 pounds of milkfat fluid using an inoculation proportion of about 0.015%. If desired, an inoculation proportion within the range of between about 0.013% and about 0.026%, for example, may be used. In general, greater proportional additions of culture bacteria to a milkfat fluid batch will lead to somewhat reduced processing time, but at the expense of increased costs for the bacteria.

In one embodiment according to the present invention, the milkfat fluid is agitated following the addition of the culture bacteria, since the culture bacteria are typically added in a small proportion compared with the milkfat fluid, and hence desirably are dispersed so that they can act throughout the milkfat fluid. Agitation can if desired begin prior to addition of the culture bacteria, and can if desired be continued after dispersion of the culture bacteria. The shear force applied by the agitation should be sufficient to disperse the culture bacteria in a reasonable time, but not so strong as to substantially shear and thus degrade the culture bacteria or the proteins and butterfat in the milkfat fluid. In one embodiment according to the present invention, moderate agitation of the milkfat fluid containing the culture bacteria is continued for between about 10 minutes and about 25 minutes. In another embodiment according to the present invention, moderate agitation is continued for about 15 minutes.

In step 145, the bacteria, if added at step 140, are cultured in the milkfat fluid. In one embodiment according to the present invention, the milkfat fluid is held at a suitable temperature long enough for cultures of the selected bacteria to begin development, resulting in a slight thickening of the milkfat fluid. The necessary duration of such bacteria culturing depends on the level of bacteria activity, the selected culture temperature, the initial bacteria concentration, and the composition of the milkfat fluid. The bacteria digest lactose sugars in the milk. Higher culture temperatures and initial bacteria concentrations generally shorten the culture time needed. The temperature employed, however, must be within a range tolerable to the survival and growth of the selected culture bacteria. In one embodiment according to the present invention, the milkfat fluid is cultured with the selected bacteria for between about 60 minutes and about 90 minutes. A bacteria culture step of such a limited duration generates a mild thickening of the milkfat fluid.

In one embodiment according to the present invention, the butterfat content of the milkfat fluid is standardized at step 150 to a desired level. The butterfat content of the final yogurt cream cheese product can then be projected based on the proportion of yogurt to be used, and its butterfat content. For example, cream cheese is defined to include a minimum butterfat content of 33% by weight. Given the variable nature of raw milk, for example, standardization of the butterfat content in a given batch of milkfat fluid may generally be desirable in furtherance of process stability and production of a uniform product. According to one embodiment of the present invention, the butterfat content of the milkfat fluid is adjusted to within a range of between about 33% and about 50% by weight. According to another embodiment of the present invention, the butterfat content of the milkfat fluid is adjusted to within a range of between about 33% and about 36% by weight. According to a further embodiment of the present invention, the butterfat content of the milkfat fluid is adjusted to within a range of between about 33% and about 34% by weight. According to yet another embodiment of the present invention, the butterfat content of the milkfat fluid is adjusted to about 34.5% by weight. According to a further embodiment of the present invention, the butterfat content of the milkfat fluid is adjusted to within a range of between about 17% and about 33% by weight. According to yet a further embodiment of the present invention, the butterfat content of the milkfat fluid is adjusted to within a range of between about 10% and about 17% by weight.

In general, the texture and mouth feel of cream cheese improves with higher butterfat content. Higher butterfat levels also provide better tolerance of the milkfat fluid to processing steps, such as agitation shear that can degrade protein and butterfat molecules. However, higher butterfat levels also lead to correspondingly higher butterfat content in the finished cream cheese, which is undesirable from a health standpoint. This standardization can alternatively be carried out prior to culturing the bacteria at step 145, but this practice generally is not preferred.

The initial butterfat level present in a given batch of milkfat fluid can be measured, for example, using a standard Babcock test. For background, see Baldwin, R. J., "The Babcock Test," Michigan Agricultural College, Extension Division, Bulletin No. 2, Extension Series, March 1916, pp. 1-11; the entirety of which is herein incorporated by reference. Where the initial butterfat level present in a given batch of milkfat fluid is too high, adjustment can be accomplished by adding a nonfat material such as skim milk. Addition of water is generally ineffective since the water content of the curd directly affects the product texture, and the feasibility of adding water alone to adjust the butterfat level in the final product is accordingly limited. In one embodiment according to the present invention, the butterfat content of a batch of milkfat fluid is downwardly adjusted by addition of an appropriate amount of nonfat dry milk together with adequate water to rehydrate the nonfat dry milk, which has the advantage of not contributing excess water to the batch. In the event that the initial butterfat level present in a given batch of milkfat fluid needs to be upwardly adjusted, this can be accomplished by addition of a material containing a higher concentration of butterfat, such as, for example, cream.

According to further embodiments of the present invention, the relative milkfat fluid concentrations of butterfat, milkfat protein, and water are all controlled. As explained above, the butterfat content of the final yogurt cream cheese product is selected as desired. For example, cream cheese generally needs to include at least about 33% by weight of butterfat. Regarding protein, higher concentrations are generally desirable for nutritional considerations. Water is a secondary ingredient that is necessary to a reasonable degree to facilitate processing, as well as to provide a desirable texture in the product. However, excessive water will not be retained in the curd and hence becomes a processing hindrance and expense, and a disposal issue. In one embodiment according to the present invention, the milkfat fluid comprises: about 34.5% to about 50% butterfat, about 3% to about 7% milk protein, and about 59% to about 42% water, with the balance constituted by other milk solids.

Referring to FIG. 1, a stabilizer is desirably added to the milkfat fluid at step 155. Stabilizers thicken the milkfat fluid by binding water, which may contribute to retention of whey in the milkfat fluid during subsequent processing. Step 155 is preferably carried out after completion of any bacteria culture in steps 135-145 and after completion of any standardization of the butterfat level at step 150; but can be carried out if desired at an earlier stage in phase I as generally indicated at 110. Step 155 can also be carried out if desired at a later stage in the process shown in FIG. 1. However, step 155 is preferably completed prior to homogenization step 185 discussed further below, so that any lumpy texture in the product resulting from stabilizer addition is corrected during homogenization.

The stabilizer may be selected from, for example, gums, salts, emulsifiers, and their mixtures. Suitable gums include, for example, locust bean gum, xanthan gum, guar gum, gum arabic, and carageenan. Suitable salts include, for example, sodium chloride and potassium chloride. Suitable emulsifiers include, for example, sodium citrate, potassium citrate, mono-, di-, and tri-sodium phosphate, sodium aluminum phosphate, sodium tripolyphosphate, sodium hexametaphosphate, dipotassium phosphate, and sodium acid pyrophosphate. In one embodiment according to the present invention, the stabilizer is K6B493, a milled, dry product that is commercially available from CP Kelco US, Inc., 1313 North Market Street, Wilmington, Del. 19894-0001. Gum arabic is commercially available from TIC Gums Inc., Belcamp, Md. A stabilizer blend comprising xanthan gum, locust bean gum and guar gum is also commercially available from TIC Gums Inc. Gum-based stabilizers typically contain sodium, which should be taken into account in order to avoid excessive sodium concentrations in the final yogurt cream cheese product. For this reason, use of salts as stabilizers is also not preferred. However, the incorporation of a significant proportion of yogurt into the final product reduces the proportional sodium content, as yogurt typically has a low sodium concentration.

Preferably, an amount of a stabilizer effective to cause a moderate thickening of the milkfat fluid is added. For example, a stabilizer may be added in an amount constituting between about 0.2% by weight to about 0.5% by weight of the yogurt cream cheese product. In another embodiment, a stabilizer may be added in an amount constituting about 0.45% by weight of the yogurt cream cheese product. As the butterfat content of the chosen milkfat fluid is reduced, the proportion of stabilizer used preferably is increased.

In one embodiment according to the present invention, bacteria culture step 145 is terminated by initiating pasteurization at step 160 before substantial thickening of the milkfat fluid occurs. In general, pasteurization step 160 is carried out in the same manner as discussed above in connection with step 130. Limiting bacteria culture step 145 to a mild thickening of the milkfat fluid according to this embodiment of the present invention is a fundamental and major departure from normal production of cream cheese, in which bacteria culture is typically permitted to run its course until the pH of the milkfat fluid is reduced to within a range between about 5.0 and about 4.1. In the case of such a mild bacteria culture step, there may be very little change in the pH of the milkfat fluid. In one embodiment according to the present invention, the temperature of the milkfat fluid is gradually raised during processing in phase I, so that the temperature continues to rise after completion of bacteria culture in step 145. Hence, pasteurization is initiated in due course when the milkfat fluid reaches an effective pasteurization temperature.

In an alternative embodiment according to the present invention, the bacteria added to the milkfat fluid at step 140 may be cultured for a sufficient time to partially or substantially digest the milkfat fluid, as limited by the attendant pH reduction. Lactic acid is formed as a byproduct of metabolism of lactose by the bacteria in step 145. Hence, the measured pH of the milkfat fluid, which gradually decreases with lactic acid buildup, is an indication of the progress of the bacteria culture. If it is desired, for example, to substantially digest the milkfat fluid, then the bacteria culture step 145 may be continued until the pH of the milkfat fluid is within a range of about 5.0 to about 4.1, or within a range of about 4.6 to about 4.4, at either of which points the bacteria activity becomes substantially dormant.

In one embodiment according to the present invention, the resulting cream cheese precursor 105 is then cooled at step 165 to a suitable temperature for subsequent combination of the cream cheese precursor with yogurt in step 170. Once the pasteurization of the milkfat fluid is completed, it is generally desirable to promptly lower the temperature of the resulting cream cheese precursor 105 to a more moderate level in order to reduce ongoing heat damage to the butterfat and milk proteins. In addition, it may be desired to downwardly adjust the temperature of the cream cheese precursor 105 so as not to unduly shock or kill the beneficial bacteria present in the yogurt during combination of the yogurt with the cream cheese precursor, as will be discussed further below in connection with step 170. The high temperatures necessary for pasteurization cannot then be maintained, because they will kill the beneficial yogurt bacteria.

More broadly, the cream cheese precursor 105 is desirably cooled to a temperature that will facilitate reaching an appropriate temperature for carrying out phase II. In one embodiment according to the present invention, the cream cheese precursor 105 is cooled to a temperature within a range of between about 110° F. and about 128° F. In another embodiment according to the present invention, the cream cheese precursor 105 is cooled to a temperature within a range of between about 115° F. and about 128° F. In a further embodiment according to the present invention, the cream cheese precursor 105 is cooled to a temperature within a range of between about 120° F. and about 125° F. In an additional embodiment according to the present invention, the cream cheese precursor 105 is cooled to a temperature of about 125° F. If, alternatively, the cream cheese precursor 105 will be stored prior to further processing, then it is preferably cooled to a refrigeration temperature such as, for example, a temperature within a range of between about 34° F. and about 38° F.

The resulting cream cheese precursor 105 is then ready for further processing to prepare the yogurt cream cheese product 120 according to phase II generally indicated at 115 in FIG. 1. This cream cheese precursor 105 is a uniform, fluid material containing the butterfat and whey from the milkfat fluid. The cream cheese precursor 105 is characterized 5 by substantially reduced bacterial activity due to its pasteurization. The preparation of the cream cheese precursor 105 does not require and preferably does not include homogenization or acidification at any point in phase I generally indicated at 110, which are steps normally included in preparation of cream cheese, although these steps can be undertaken if desired. Acidification in phase I, for example, would cause the curd and whey to separate, defeating the goal of including the whey from the milkfat fluid in the final yogurt cream cheese product. Homogenization, for example, is wholly unnecessary in phase I of the production of the yogurt cream cheese product. Homogenization at this point would subject the cream cheese precursor 105 to unnecessary processing that would needlessly increase the processing time and costs, while not substantially contributing to the quality of the final yogurt cream cheese product.

The cream cheese precursor 105 produced according to the process of the present invention is not cream cheese. Substitution of cream cheese for the cream cheese precursor 105 as an ingredient in step 170 to be discussed below defeats the desirable goal of providing a cream cheese product having retained whey, because whey is separated from the curd in conventional cream cheese production. Moreover, cream cheese and yogurt cannot be directly combined in mutually substantial proportions to yield a homogenous single-phase product.

Although the process according to the present invention does not produce conventional cream cheese, nevertheless conventional cream cheese can if desired be an ingredient in the yogurt cream cheese product. For example, conventional cream cheese can, if desired, be added to the cream cheese precursor 105 in any desired proportion. As the proportion of conventional cream cheese in the final yogurt cream cheese product increases, the benefits of the teachings according to the present invention are achieved to a correspondingly reduced degree.

Referring to FIG. 1, the cream cheese precursor 105 and a source of yogurt are then combined at step 170 to produce a combined precursor. In general, any yogurt may be used. Yogurt is broadly defined as a milkfat fluid that is cultured by at least one bacteria strain that is suitable for production of yogurt. In one embodiment according to the present invention, the yogurt comprises: about 0% to about 3.25% butterfat, about 3% to about 6% milk protein, and about 76% to about 88% water. In another embodiment according to the present invention, the yogurt comprises: about 0.5% to about 3.25% butterfat, about 3.47% to about 5.25% milk protein, and about 76% to about 88% water. In yet a further embodiment according to the present invention, the yogurt comprises: about 0.5% to about 2.0% butterfat, about 5% milk protein, and about 85% water. In still another embodiment according to the present invention, the yogurt comprises about 0.16% butterfat, about 5.12% milk protein, and about 76% water. In general, any of the foregoing yogurts will have a total solids content of at least about 8% by weight.

In one embodiment according to the present invention, suitable yogurt 260 is prepared according to the exemplary process 200 shown in FIG. 2. Referring to FIG. 2, milk is provided at step 210. The milk employed to produce the yogurt 260 can be, for example, whole milk, reduced fat milk, or skim milk. Butterfat present in the milk facilitates processing because butterfat contributes to the feasibility of thickening the final product to a desirable consistency. However, butterfat present in the milk used in producing the yogurt 260 also results in a higher butterfat concentration in the final yogurt cream cheese product. In one embodiment according to the present invention, the milk employed to produce the yogurt 260 accordingly is skim milk. In another embodiment according to the present invention, the butterfat content of the milk is less than 1% by weight. In any case, the selected milk can be directly sourced from liquid milk such as cow milk, or it can be reconstituted from dry milk.

In a further embodiment according to the present invention, the solids level of the milk to be used in preparing the yogurt 260 is standardized to within a range of between about 18% and about 22% by weight. In another embodiment according to the present invention, the solids level of the milk is standardized to about 22% by weight. If the solids level of the milk is in substantial excess of 22% by weight, the bacteria culture used to produce the yogurt 260 may digest the milk too slowly for practical production of yogurt. However, if a particularly robust bacteria strain is used, or if the milk is inoculated with an extra high bacteria load, use of milk with higher solids content may be feasible. Alternatively, the solids level of the milk can be standardized to within a range of between about 10% and about 12% by weight, as is employed in conventional preparation of yogurt. However, such a relatively low solids level can hinder production of a final yogurt cream cheese product having a desirably thick texture. The solids content of the milk provided at step 210 can be increased if desired by any process suitable to yield a condensed milk. Condensation processes that do not involve heating the milk, such as ultrafiltration, are preferred in order to reduce processing damage of the milk.

At step 220, the milk is pasteurized. Pasteurization should generally be carried out as earlier discussed, for example, at a temperature of at least about 165° F. for at least about 15 minutes. In one embodiment according to the present invention, pasteurization of the milk is carried out at a temperature of about 170° F. for about 30 minutes. Agitation should be provided to facilitate even heating of the milk and to avoid localized overheating.

At step 230, the milk is then cooled to a bacteria culture temperature. Once the pasteurization of the milk is completed, it is generally desirable to promptly lower the temperature of the milk to a more moderate level in order to reduce ongoing heat damage. In addition, bacteria will be cultured in the milk at steps 240-250, as will be discussed further below. As pointed out above, the high temperatures necessary for pasteurization cannot persist when the culture bacteria are added at step 240. In one embodiment according to the present invention, the milk is cooled at step 230 to a temperature within a range of between about 90° F. and about 115° F. In another embodiment according to the present invention, the milk is cooled at step 230 to a temperature within a range of between about 106° F. and about 110° F. In yet a further embodiment according to the present invention, the milk is cooled at step 230 to a temperature of about 108° F.

At step 240, culture bacteria are added to the milk. Since yogurt 260 is the desired product of the process in FIG. 2, bacteria strains that are suitable for production of yogurt are used. For example, *Lactobacillus delbrueckii* subspecies *bulgaricus*, *Streptococcus thermophilus*, *Lactobacillus acidophilus*, *Bifidobacterium*, and *Lactobacillus paracasei* subspecies *casei* can be used. If available, other lactic acid-producing bacteria strains suitable for making yogurt can be used. Suitable yogurt culture bacteria strains are commercially available under the trade name Yo-Fast® from Chr. Hansen, Bøge Allé 10-12, DK-2970 Hørsholm, Denmark. In one embodiment according to the present invention, F-DVS YoFast®-10 is used, which contains blended strains of *Streptococcus thermophilus*, *Lactobacillus delbrueckii* subspecies *bulgaricus*, *Lactobacillus acidophilus*, *Bifidobacterium*, and *Lactobacillus paracasei* subspecies *casei*. In another embodiment according to the present invention, DVS YoFast®-2211 is used.

In a further embodiment according to the present invention, a yogurt culture comprising *Lactobacillus acidophilus*, *Bifidobacterium*, and *L. casei* is used. For example, Yo-Fast® 20 cultures comprise mixtures of *Lactobacillus acidophilus*, *Bifidobacterium*, and *L. casei*. Such yogurt cultures can develop a very mild flavor and have high texturing properties, making possible the reduction or elimination of stabilizers and additives that may otherwise be needed for increasing the product viscosity. These yogurt cultures require minimal post-acidification, resulting in longer product shelf life. Such yogurt cultures also lend a desirable mouth feel and creaminess to low-fat products.

Further suitable bacteria strains are commercially available under the trade names Ultra-Gro® and Sbifidus® from Degussa BioActives, 620 Progress Avenue, P.O. Box 1609, Waukesha, Wis. 53187-1609.

Once a culture bacteria strain is selected, an amount is added to the milk that is effective to propagate live cultures throughout a given batch of milk in a reasonable time at the chosen culture temperature. In general, greater proportional additions of culture bacteria to a milk batch will reduce processing time, but at the expense of increased costs for the bacteria.

In one embodiment according to the present invention, the milk is agitated following the addition of the culture bacteria, since the culture bacteria are typically added in a small proportion compared with the milk, and desirably are dispersed so that they can act throughout the milk. Agitation can if desired begin prior to addition of the culture bacteria, and can if desired be continued after dispersion of the culture bacteria. The shear force applied by the agitation should be sufficient to disperse the culture bacteria in a reasonable time, but not so strong as to shear and thus degrade the culture bacteria or the proteins and butterfat in the milk. In one embodiment according to the present invention, moderate agitation of the milk containing the culture bacteria is continued for between about 10 minutes and about 25 minutes. In another embodiment according to the present invention, moderate agitation is continued for about 15 minutes.

In step 250, the bacteria added at step 240 are cultured in the milk. The milk is held at a suitable temperature for cultures of the selected bacteria to develop for a sufficient time so that there is visible curd formation throughout the milk, resulting in a substantial thickening. In one embodiment according to the present invention, the milk is held at a temperature within a range of between about 95° F. and about 112° F. In another embodiment according to the present invention, the milk is held at a temperature within a range of between about 100° F. and about 110° F. In a further embodiment according to the present invention, the milk is held at a temperature within a range of between about 106° F. and about 110° F. In an additional embodiment according to the present invention, the milk is held at a temperature of about 108° F. The necessary duration of the bacteria culturing depends on the level of bacteria activity, the selected culture temperature, the initial bacteria concentration, and the composition of the milk. In one embodiment according to the present invention, the milk is cultured with the selected bacteria for between about 4 hours and about 6 hours. In another embodiment according to the present invention, the milk is cultured with the selected bacteria at a temperature of about 108° F. for about 6 hours.

Lactic acid is formed as a byproduct of metabolism of lactose by the bacteria in step 250. Hence, the measured pH of the milk, which gradually decreases with lactic acid buildup, is an indication of the progress of the bacteria culture. Further, when the pH of the milk reaches about 4.4, the level of bacterial activity begins to markedly decrease. In one embodiment according to the present invention, the bacteria culture step 250 is continued until the pH of the milk is within a range of about 5.0 to about 4.1. In another embodiment according to the present invention, the bacteria culture step 250 is continued until the pH of the milk is within a range of about 4.6 to about 4.4; and more preferably about 4.5.

When the bacteria culture step 250 is complete, the resulting product is yogurt 260 containing live bacteria cultures. Preferably, the yogurt has a uniform consistency with a solids content of at least about 8%.

Returning to FIG. 1, phase II begins with combining the cream cheese precursor 105 and a yogurt source together at step 170 to yield a combined precursor. Yogurt 260 and the cream cheese precursor 105 desirably are simultaneously prepared so that phase II of FIG. 1 as generally indicated at 115 can then immediately be carried out. In this manner, the active yogurt 260 is already at a suitable temperature, as discussed above, for combination with the cream cheese precursor 105 at step 170; and the cream cheese precursor 105 can be cooled at step 165 to that same temperature or to another compatible temperature.

Alternatively, if the yogurt 260 is prepared in advance of undertaking phase II of FIG. 1, then the yogurt desirably is cooled in the meantime to a refrigeration temperature such as, for example, within a range of between about 34° F. and about 38° F., to retard unwanted continuation of bacterial activity, and is then reheated. In one embodiment according to the present invention, the yogurt 260 is reheated to a temperature within a range of between about 95° F. and about 112° F. In another embodiment according to the present invention, the yogurt 260 is reheated to a temperature within a range of between about 100° F. and about 110° F. In a further embodiment according to the present invention, the yogurt 260 is reheated to a temperature within a range of between about 106° F. and about 110° F. In an additional embodiment according to the present invention, the yogurt 260 is reheated to a temperature of about 108° F. However, the necessary heat cycling in such reheating causes degradation of the yogurt, including precipitation of the curd and attendant syneresis, and including a reduction in the live yogurt bacteria concentration. Accordingly, reheating desirably is avoided.

In one embodiment according to the present invention, the cream cheese precursor 105 and yogurt 260 are combined together at step 170 of FIG. 1 at selected temperatures, in selected proportions, and in a selected manner.

Ambient air contains harmful bacteria that can degrade the cream cheese precursor 105 and the yogurt 260. Accordingly, exposure of these ingredients during and after their preparation to air, as well as air exposure of the resulting combined precursor and the completed yogurt cream cheese product, desirably are minimized.

Assuming that the above-discussed preparations of the cream cheese precursor 105 and yogurt 260 have been simultaneously completed, the respective temperatures of these ingredients are preferably controlled with attention to preserving live culture bacteria in the yogurt, to minimizing further heating and cooling operations, and to preventing shock to or death of the live yogurt culture bacteria. Live yogurt bacteria cultures themselves provide well-known health benefits to the consumer, and accordingly are preferably included in the final yogurt cream cheese product. If either of the cream cheese precursor 105 and yogurt 260 ingredients to be so used is either too hot or too cold, its temperature can be adjusted. In one embodiment according to the present invention, the temperatures of the cream cheese precursor 105 and the yogurt 260 are adjusted before combining them together to within a range of between about 110° F. and about 128° F., and to within a range of between about 95° F. and about 112° F., respectively. In a further embodiment according to the present invention, the temperatures of the cream cheese precursor 105 and the yogurt 260 are adjusted before combining them together to within a range of between about 115° F. and about 128° F., and to within a range of between about 100° F. and about 110° F., respectively. In another embodiment according to the present invention, the temperatures of the cream cheese precursor 105 and the yogurt 260 are adjusted before combining them together to within a range of between about 120° F. and about 125° F., and to within a range of between about 100° F. and about 108° F., respectively. In an additional embodiment according to the present invention, the temperatures of the cream cheese precursor 105 and the yogurt 260 are adjusted before combining them together to temperatures of about 125° F. and about 108° F., respectively.

The proportions of cream cheese precursor 105 and yogurt 260 to be combined at step 170 are a matter of discretion. However, the cream cheese precursor 105 typically contains a relatively higher concentration of butterfat, and the yogurt 260 typically contains a relatively lower concentration of butterfat, cholesterol and sodium, and a relatively higher concentration of milk protein. Further, a substantial proportional addition of yogurt 260 to the cream cheese precursor 105 contributes the robust flavor, reduced cholesterol, and healthful active bacteria cultures of yogurt to the overall product. Hence, according to one embodiment of the present invention a sufficient proportion of yogurt 260 is used relative to a given batch of cream cheese precursor 105, to yield a desired substantial improvement in the flavor and a desired substantial influence of the beneficial constituents in the yogurt on their mixture relative to that in the cream cheese precursor.

According to another embodiment of the present invention, the mixture of cream cheese precursor 105 and yogurt 260 is controlled to comprise between about 10% and about 40% by weight of yogurt. In an additional embodiment according to the present invention, the mixture of cream cheese precursor 105 and yogurt 260 is controlled to comprise between about 14% and about 30% by weight of yogurt. According to a further embodiment of the present invention, the mixture of cream cheese precursor 105 and yogurt 260 is controlled to comprise between about 14% and about 22% by weight of yogurt. According to an additional embodiment of the present invention, the mixture of cream cheese precursor 105 and yogurt 260 is controlled to comprise about 20% by weight of yogurt. Where flavorings are to be added to the cream cheese product, slightly lower proportions of yogurt generally are preferred, for example about 14% to about 18% by weight of yogurt, and more preferably about 16% by weight of yogurt.

The cream cheese precursor 105 and the yogurt 260 are combined together at step 170. Desirably, this combination step is carried out within a reasonable time following completion of the preparation of the cream cheese precursor 105 in phase I shown in FIG. 1, and within a reasonable time following completion of the preparation of the yogurt 260 as shown in FIG. 2. However, provided that excessive bacterial activity or heat-induced degradation is not permitted to take place in either of these ingredients over an extended time period before they are combined together, the cream cheese precursor 105 and the yogurt 260 can be separately stored as desired prior to carrying out step 170.

Where the relative proportion of yogurt 260 is small compared to the proportion of cream cheese precursor 105, it is generally easier to combine the minor yogurt ingredient into the major cream cheese precursor ingredient. In general, the cream cheese precursor 105 and the yogurt 260 are combined with moderate agitation for a time sufficient to thoroughly mix them together. Care should again be taken to minimize shearing of milk proteins, butterfat, and the live culture bacteria. In one embodiment according to the present invention, the combined precursor resulting from combination of the cream cheese precursor 105 and the yogurt 260 is then maintained at a temperature within a range of between about 118° F. and about 125° F. In another embodiment according to the present invention, the combined precursor resulting from combination of the cream cheese precursor 105 and the yogurt 260 is then maintained at a temperature within a range of between about 118° F. and about 120° F.

Desirably, the cream cheese precursor 105 and yogurt 260 are thoroughly mixed before reaching homogenization at step 185 discussed below. This mixing can be carried out in a vessel provided with an agitator, separate from the vessel in which the homogenization occurs. Such thorough mixing prior to homogenization can result in a more uniform consistency in the final yogurt cream cheese products. Such a vessel can be provided with internal or external heat and cooling exchangers in order to adjust or control the temperature of the combined precursor to a desired temperature as further discussed below.

At step 185, the combined precursor is homogenized by subjecting it to an elevated pressure, desirably at an elevated temperature, for a suitable period of time. Application of such an elevated pressure breaks down the butterfat globules in the combined precursor, resulting in substantially increased product uniformity. In general, homogenization is carried out at an elevated pressure, which can be applied to the combined precursor by any suitable means, such as, for example, hydraulic or mechanical force. In one embodiment according to the present invention, the combined precursor is compressed to the selected pressure and then passed through an orifice to quickly reduce such pressure. Homogenization is desirably carried out at a relatively high temperature, because the resulting fluidity of the combined precursor increases the efficiency of the homogenization step. However, at a temperature greater than about 128° F. the desirable yogurt bacteria generally cannot survive, and temperatures above about 125° F. result in gradual bacteria death. Accordingly, in one embodiment according to the present invention, the homogenization step 185 is carried out at a controlled temperature not in excess of about 125° F. In another embodiment according to the present invention, homogenization is carried out at a controlled temperature within a range of between about 118° F. and about 125° F. In a further embodiment according to the present invention, homogenization is carried out at a controlled temperature within a range of between about 118° F. and about 120° F. Although higher temperatures can be used, desirably a temperature is chosen that will not kill the live culture bacteria in the product. Homogenization can be carried out, for example, in a Gaulin homogenizer.

In one embodiment according to the present invention, the homogenization pressure is within a range of between about 2,000 pounds per square inch (PSI) to about 4,000 PSI. In another embodiment according to the present invention, the homogenization pressure is within a range of between about 2,500 PSI to about 3,200 PSI. As the applied pressure increases, the resulting viscosity of the final yogurt cream cheese product accordingly increases. Hence, the pressure to be applied is preferably chosen to yield a final product of the desired consistency.

In one embodiment according to the present invention, a homogenizer is employed having a homogenization chamber, an inlet chamber, and an outlet chamber. The inlet chamber is a vessel suitable for staging a supply of the combined precursor, on a continuous or batch basis, for introduction into the homogenization chamber. The homogenization chamber is a vessel having controllable orifices for input and output of the combined precursor, and is reinforced to withstand containment of an elevated pressure suitable for homogenization. The outlet chamber is a vessel suitable for staging a supply of the homogenized combined precursor, on a continuous or batch basis, for further processing. The combined precursor passes through the inlet chamber before being pumped into the homogenization chamber. Following homogenization, the combined precursor is expelled from the homogenization chamber into the outlet chamber. These flows are typically carried out on a continuous basis, although a batch process can also be done. The pressure within the homogenization chamber is adjusted to the chosen homogenization pressure and maintained there during homogenization. The pressure in the inlet chamber may be, for example, within a range of between about 20 PSI and about 40 PSI, generated by pumping of the combined precursor into the inlet chamber. Similarly, the pressure in the outlet chamber may be, for example, within a range of between about 20 PSI and about 40 PSI, generated by expelling the combined precursor from the homogenization chamber and then containing it in the outlet chamber. The combined precursor can undergo a pressure drop upon passing from the homogenization chamber to the outlet chamber, by ejection through a hole, such as for example a hole having a diameter of about a centimeter. The pressures within the inlet chamber, outlet chamber and homogenization chamber are carefully controlled so that air is not entrained into the homogenization chamber. Such air can cause cavitation, which can degrade the product and potentially lead to an explosive release of the homogenization pressure.

At step 190, the combined precursor is acidified to a pH suitable to retard activity of bacteria, and to complete the coagulation of the combined precursor to yield the yogurt cream cheese product 120. Desirably, acidification is carried out promptly following formation of the combined precursor at step 170. In one embodiment according to the present invention, acidification is completed within less than about three (3) hours following preparation of the combined precursor at step 170. In another embodiment according to the present invention, acidification is completed within less than about two (2) hours following preparation of the combined precursor at step 170. In a further embodiment according to the present invention, acidification is completed within less than about thirty (30) minutes following preparation of the combined precursor at step 170. Where acidification is delayed substantially beyond three hours following preparation of the combined precursor at step 170, the viscosity of the final yogurt cream cheese product tends to be correspondingly reduced, and the consistency of the product tends to break down with attendant syneresis. While not wishing to be bound by theory, it is believed that excessive bacterial activity in the combined precursor is a substantial contributing cause of these adverse effects.

In one embodiment according to the present invention, a first point in time T1 when the cream cheese precursor 105 and the yogurt 260 are combined together at step 170 to produce the combined precursor, and a second point in time T2 when the combined precursor is acidified at step 190, are both monitored and controlled. In a further embodiment according to the present invention, T2 is within about three (3) hours or less following T1. In an additional embodiment according to the present invention, T2 is within about two (2) hours or less following T1. In another embodiment according to the present invention, T2 is within about thirty (30) minutes or less following T1.

In an additional embodiment according to the present invention, a first point in time T1 when the cream cheese precursor 105 and the yogurt 260 are combined together at step 170 to produce a batch of the combined precursor, and a second point in time T2 when the batch of combined precursor is acidified at step 190, are both monitored and controlled. In a further embodiment according to the present invention, T2 is within about three (3) hours or less following T1. In another embodiment according to the present invention, T2 is within about two (2) hours or less following T1. In an additional embodiment according to the present invention, T2 is within about thirty (30) minutes or less following T1.

In the preceding embodiments wherein the first and second points in time T1 and T2 are monitored and controlled, the time delay is managed between the point in time of production of a given portion of combined precursor and the point in time of acidification of that same portion. By "monitored" is meant that the first and second points in time T1 and T2 are registered in a suitable manner, which may for example be automated or manual. By "controlled" is meant that the time delay between the first and second points in time T1 and T2 is regulated in a suitable manner, which may for example be automated or manual. In this manner, the yogurt cream cheese product generated from a particular portion of combined precursor will have a desirable viscosity and shelf life. In a continuous production operation, the yogurt cream cheese output from the process shown in FIG. 1 will be of a consistently satisfactory quality, without pockets of low viscosity or of propensity to accelerated spoilage. In a batch production operation, the entire batch will be of such satisfactory quality, rather than resulting in pockets of poor quality product or in sub-batches of varying quality. For example, a large batch of combined precursor which is further processed as a series of sub-batches will not be acidified over a time delay period in excess of about three hours, thus preventing the generation of sub-batches of declining quality as the delay increases.

Although the cream cheese precursor 105 is pasteurized at step 160, the yogurt 260 typically contains live bacteria cultures and becomes the mother culture for the combined precursor. Accordingly, it is expected that other measures for retarding the bacterial activity in the combined precursor can be carried out alternatively to or in conjunction with timed acidification. In one embodiment according to the present invention, homogenization and acidification are carried out on a substantially simultaneous basis in order to minimize the time to completion of these steps. The optimum temperature zone for rapid bacterial growth is generally within a range of between about 75° F. and about 115° F. Accordingly, the combined precursor and the resulting yogurt cream cheese product are desirably exposed to temperatures within this range for as short a time period as reasonably possible in order to minimize undesirable and excessive bacterial activity and spoilage in the product. Hence, in one embodiment according to the present invention, the temperature of the combined precursor is rapidly reduced to retard bacterial activity at a time following completion of step 170, and subsequent steps in the process for making the yogurt cream cheese product are then carried out at such a reduced temperature or temperatures in order to minimize the cumulative bacterial activity on the combined precursor during the balance of phase II. In a further embodiment according to the present invention, such temperature reduction is carried out at a time following completion of step 170, but the temperature of the combined precursor is subsequently raised to optimize homogenization in step 185 as discussed above and then is reduced again to retard bacterial activity. These embodiments may permit the completion of acidification step 190 to be delayed for up to about seven (7) hours following preparation of the combined precursor at step 170.

In one embodiment according to the present invention, acidification step 190 is carried out in the outlet chamber of the homogenizer discussed above, desirably adjacent to the homogenization chamber. In this manner, step 190 can be carried out as soon as homogenization in step 185 is completed, typically on a continuous basis. The outlet chamber can comprise, for example, a set tank internally equipped with a scraped surface agitator to ensure rapid and thorough mixing of added acid with the homogenized combined cream cheese precursor. Agitation desirably is discontinued upon reaching the desired product pH, in order to avoid excessive shearing and possible resulting viscosity breakdown in the yogurt cream cheese. Acidification can generally be carried out at the same temperature range or temperature employed for homogenization. For example, acidification can be carried out at a temperature of about 125° F. If desired, acidification can be carried out at a lower temperature than that employed in homogenization step 185, although the viscosity increases as the temperature is reduced, and feasibility of mixing the acidification agent into the yogurt cream cheese is also important. In one embodiment according to the present invention, the temperature of the combined precursor is reduced at least to a temperature within a range of between about 112° F. and about 114° F. during or after acidification in step 190. In another embodiment according to the present invention, the temperature of the combined precursor is reduced to a temperature of less than about 100° F. during or after acidification in step 190. In a further embodiment according to the present invention, the temperature of the combined precursor is reduced to a temperature of less than about 75° F. at a point during or after acidification in step 190. Carrying out acidification becomes gradually more difficult as the temperature of the combined precursor is lowered, due to the steadily increasing viscosity. Furthermore, acidification at a temperature below about 60° F. may result in a lumpy yogurt cream cheese texture. Cooling can be effected, for example, using jacketed tanks containing a glycol refrigerant maintained at a desired temperature to withdraw heat from the combined precursor in the tank.

Acidification causes substantial thickening of the combined precursor, and may hinder homogenization if acidification is carried out before homogenization. However, the order of homogenization step 185 and acidification step 190 can be inverted so that acidification is carried out first, if desired; or as discussed earlier these steps can be concurrently carried out. For example, acidification step 190 can be carried out in the inlet chamber of a homogenizer, the inlet chamber being equipped with a scraped surface agitator, or can be carried out as part of combining the cream cheese precursor 105 and yogurt 260 in step 170.

In one embodiment according to the present invention, the pH of the combined precursor is adjusted to within a range of about 5.0 to about 4.1, more preferably about 4.6 to about 4.4, and still more preferably about 4.5. In another embodiment according to the present invention, the pH of the combined precursor for producing a plain yogurt cream cheese product, meaning one that does not contain or contains minimal concentrations of fruits, vegetables, nuts, flavorings, condiments or other food additives, is adjusted to within a range of between about 4.40 and about 4.50. In a further embodiment according to the present invention, the pH of the combined precursor for a flavored yogurt cream cheese product, meaning one that does contain a significant concentration of fruits, vegetables, nuts, flavorings, condiments or other food additives, is adjusted to within a range of between about 4.38 and about 4.48. At a pH of the combined precursor lower than about 4.40 or 4.38 for plain or flavored yogurt cream cheese products respectively, the taste begins to become sharp, and at a pH of about 4.2 or lower is generally too tart. At a pH of the combined precursor above about 4.50 or 4.48 for plain or flavored yogurt cream cheese products respectively, the product viscosity begins to undesirably decline, potentially resulting in poor body or runniness.

In one embodiment according to the present invention, the pH adjustment is carried out by adding an appropriate amount of an edible acid to the combined precursor. Edible acids include, for example, lactic acid, phosphoric acid, acetic acid, citric acid, and mixtures. For example, a suitable aqueous mixture of edible acids having a pH within a range of between about 0.08 and about 1.4 is available under the trade name Stabilac® 12 Natural from the Sensient Technologies Corporation, 777 East Wisconsin Avenue, Milwaukee, Wis. 53202-5304. Similar edible acid mixtures are also available from Degussa Corporation, 379 Interpace Parkway, P.O. Box 677, Parsippany, N.J. 07054-0677. In another embodiment according to the present invention, the edible acid is lactic acid, being a metabolite naturally produced by the lactose-consuming bacteria that are used in producing the yogurt 260 and the cream cheese precursor 105.

Since the thickness of the resulting product increases as the pH is reduced, edible acid addition can be used to control the thickness of the final yogurt cream cheese product. Furthermore, bacteria present in the final product become substantially dormant at a pH substantially below about 4.38, hence acidification substantially slows down their further propagation in the product, extending its shelf life. However, the desirable yogurt bacteria are not killed by this acidification process, and thus can still provide the health benefits of active yogurt cultures to the consumer. The edible acid present in the final yogurt cream cheese product also serves to provide a good-tasting bite to the flavor. At a pH of less than about 4.2, the product not only becomes too tart but may also start to soften, reducing the viscosity.

In an alternative embodiment, a coagulating enzyme can be substituted for or used in conjunction with direct acid addition. Coagulating enzymes cause the casein protein in milk to form a gel. However, the action of coagulating enzymes generally requires much more time to completion than direct acidification, meanwhile allowing far more culture bacteria activity to occur and delaying the completion of acidification. The enzyme coagulation process is also accompanied by syneresis and the resulting loss of albumin protein from the gelled curd. Hence, enzyme coagulation generally results in an inferior product having a reduced viscosity and protein content. However, it may be feasible to reincorporate the whey into the combined precursor so long as the enzyme coagulation is carried out before homogenization. Enzymatic coagulation typically takes a long time, 12 hours for example. In general, any suitable coagulating enzyme of animal-, plant-, microbe-, or other origin can be used. In one embodiment, the coagulant enzyme is chymosin, also referred to as rennin, which is the active component of rennet. Rennet is purified from calf stomachs. Chymosin breaks down casein protein to paracasein. Paracasein then combines with calcium to form calcium paracaseinate, which precipitates and starts formation of a solid mass. Milkfat and water become incorporated into the mass, forming curds. One part rennin can coagulate about 10,000 to about 15,000 parts milkfat fluid. Alternatively, pepsin, which is purified from the stomachs of grown calves, heifers, or pigs, can be used.

In order to facilitate the time-controlled and rapid completion of acidification in step 190, live bacteria culture desirably is not carried out in the combined precursor. Assuming that the cream cheese precursor 105 and the yogurt 260 have separately undergone live bacteria culture steps as discussed above, further live bacteria culture in the combined precursor generally provides only marginal further flavor improvement. Moreover, the significant additional processing time required in order to add and culture such bacteria in the combined precursor delays the completion of acidification step 190 and cooling of the yogurt cream cheese product to a temperature of below about 75° F., which delay can result in lower product viscosity and shorter product shelf life.

However, in alternative embodiments according to the present invention, live culture bacteria may be added to the combined precursor in step 175, and then cultured in step 180. If the yogurt 260 employed at step 170 contains live bacteria cultures, then adding further culture bacteria at step 175 may be completely unnecessary. Alternatively, if the selected yogurt 260 does not contain live bacteria cultures, then such cultures may, if desired, be added at step 175. In another embodiment according to the present invention in which the cream cheese precursor 105 was not subjected to culture of bacteria at step 145, culture by yogurt bacteria may be carried out at this point. In general, culture bacteria can be so added if desired following the guidelines discussed above regarding step 240 of FIG. 2, preferably with agitation. Live yogurt bacteria cultures themselves provide well-known health benefits to the consumer, and accordingly are preferably included in the final yogurt cream cheese product. Although the combined precursor can also or alternatively be cultured by cream cheese culture bacteria such as may be employed at step 140, such cream cheese bacteria do not typically provide the health benefits that are provided to the consumer by live yogurt bacteria. In a further embodiment according to the present invention, culture bacteria are added to the cream cheese precursor 105 following pasteurization step 160.

In one embodiment according to the present invention, yogurt bacteria are then cultured in the combined precursor at step 180. The combined precursor is held at a suitable temperature for cultures of the selected bacteria to develop for a sufficient time so that there is visible curd formation throughout the combined precursor, resulting in a substantial thickening and a significant reduction in the pH. In one embodiment according to the present invention, the combined precursor is held at a temperature within a range of between about 110° F. and about 120° F. In another embodiment according to the present invention, the combined precursor is held at a temperature of about 108° F. In an additional embodiment according to the present invention, the combined precursor is cultured with the selected bacteria for between about 4 hours and about 6 hours. In another embodiment according to the present invention, the combined precursor is cultured with the selected bacteria at a temperature of about 108° F. for about 6 hours. In yet a further embodiment according to the present invention, the bacteria culture step 180 is continued until the pH of the combined precursor is within a range of about 5.0 to about 4.1, more preferably about 4.6 to about 4.4, and still more preferably about 4.5.

Returning to FIG. 1, following completion of acidification step 190 the temperature of the finished yogurt cream cheese product is preferably reduced to a suitable refrigeration temperature, such as, for example, about 34° F. to about 38° F. If desired, a suitable preservative can be added to the yogurt cream cheese product to retard bacteria, yeast and mold growth. For example, potassium sorbate, sodium benzoate, sorbic acid, ascorbic acid or nisin can be added, preferably before acidification step 190 and consequent thickening, to facilitate their dispersion in minor proportion throughout the yogurt cream cheese product. Nisin, for example, is a protein expressed by *Lactococcus lactis*. Further, if desired, flavorings, condiments and the like can be added. Adjuvants that are vulnerable to attack by the live bacteria are preferably added after reducing the temperature of the yogurt cream cheese product below about 75° F., and may need to be made resistant to such bacteria.

The yogurt cream cheese product made according to the process of the present invention generally has the appearance, consistency, and texture of cream cheese. In addition, this product has the robust, desirable flavor of yogurt. Further, the product includes retained whey from the milkfat fluid, which dramatically amplifies the flavor of the product, giving it a greatly superior and robust taste. Retention of the whey in this manner adds natural flavor without subjecting the product to large proportions of adulterating additives or heavy extra processing steps, and eliminates the pollution and economic loss resulting from whey separation in conventional cream cheese production. In addition, the yogurt cream cheese product has reduced cholesterol and sodium.

Cream cheese by definition contains at least 33% butterfat. In one embodiment in accordance with the present invention, the yogurt cream cheese product accordingly comprises between about 33% and about 40% butterfat. Neufchatel cheese by definition contains between about 17% and about 33% butterfat. In one embodiment in accordance with the present invention, the yogurt cream cheese product accordingly comprises between about 17% and about 33% butterfat. Low-fat cream cheese by definition contains between about 10% and about 17% butterfat. In one embodiment in accordance with the present invention, the yogurt cream cheese product accordingly comprises between about 10% and about 17% butterfat.

Addition of significant proportions of yogurt tends to somewhat reduce the butterfat content of the overall yogurt cream cheese product. Thus, in one embodiment according to the present invention, the yogurt cream cheese product comprises between about 8% by weight and about 35% by weight of butterfat. In another embodiment according to the present invention, the yogurt cream cheese product comprises between about 10% by weight and about 26% by weight of butterfat. In yet another embodiment according to the present invention, the yogurt cream cheese product comprises between about 23% by weight and about 26% by weight of butterfat. In yet a further embodiment according to the present invention, the yogurt cream cheese product comprises between about 25% by weight and about 26% by weight of butterfat. In yet another embodiment according to the present invention, the yogurt cream cheese product further comprises between about 2% by weight and about 14% by weight of milk protein, more preferably between about 3% by weight and about 8% by weight of milk protein, and still more preferably between about 4% by weight and about 5% by weight of milk protein. In another embodiment according to the present invention, the yogurt cream cheese product comprises between about 0.05% and about 0.09% by weight of cholesterol; between about 0.2% by weight and 0.4% by weight of sodium; and between about 58% by weight and 63% by weight of water.

In one embodiment according to the present invention, inulin is added to the yogurt cream cheese product. Inulin is a polysaccharide that is naturally found in many plants. Inulin has a mildly sweet taste and is filling like starchy foods, but is not normally absorbed in human metabolism and therefore does not affect the sugar cycle. Inulin reduces the body's need to produce insulin, helping to restore normal insulin levels. In addition to being thus beneficial for diabetics, inulin contributes to the body of yogurt cream cheese products, making possible the incorporation of as much as between about 2% and about 4% more yogurt into a given yogurt cream cheese product. Inulin also is a prebiotic that extends the viability of the yogurt bacteria in the digestive tract of the consumer, so that their beneficial effects in the body are increased. Inulin may, however, be implicated in food allergies, and can potentially induce anaphylactic shock in some people. Other non-digestible oligosaccharides and oligosaccharides resistant to metabolism, collectively referred to herein as "digestion-resistant polysaccharides", such as lactulose and lactitol, can also be used.

Various highly processed dairy derivatives have the potential for use in modifying the flavor and texture of cream cheese products. These derivatives include, for example, milk protein concentrate, whole milk protein, whey protein concentrate, casein, Baker's cheese, yogurt powder and dry cottage cheese curd. Milk protein concentrate, for example, is produced by ultrafiltration of milk. Such materials could be added to the yogurt cream cheese product made in accordance with the present invention, or introduced during preparation of the product. However, their use is not preferred, and can by practice according to the present invention be minimized. Furthermore, addition of such agents generally is a poor substitute for the retention of whey from the milkfat fluid and the incorporation of yogurt, both such desirable results being as achieved in accordance with the present invention. In one embodiment according to the present invention, at least about 40% of the milk protein in the yogurt cream cheese product is derived from the milkfat fluid and yogurt. In another embodiment according to the present invention, at least about 50% of the milk protein in the yogurt cream cheese product, and potentially in excess of 60% of the milk protein in the yogurt cream cheese product, is derived from the milkfat fluid and yogurt. The balance of the protein may be derived, for example, from added nonfat dry milk and stabilizer.

Syneresis leads to an unattractive and wasteful phase separation between curds and whey when milk is directly coagulated. In one embodiment according to the present invention, the yogurt cream cheese product exhibits substantially no syneresis, or less than about 1% syneresis by weight, after 15 hours at a temperature within a range of between about 74° F. to about 75° F.

The texture and consistency of the yogurt cream cheese product made in accordance with one embodiment of the present invention is the same as that of ordinary cream cheese. For example, the yogurt cream cheese product may have a viscosity within a range of between about 1,000,000 centipoises and about 3,000,000 centipoises at a temperature of about 74° F. In another embodiment according to the present invention, the yogurt cream cheese product has a viscosity within a range of between about 1,000,000 centipoises and about 2,000,000 centipoises at a temperature of about 74° F. Viscosity is conventionally measured, using, for example, a Brookfield viscometer. Viscosities as low as about 700,000 centipoises may also be acceptable.

In yet a further embodiment according to the present invention, the consistency of the yogurt cream cheese product can be modified to yield a whipped, more easily spreadable product. Referring to FIG. 3, an exemplary process 300 for carrying out a whipping operation is shown. The process begins with providing a yogurt cream cheese product at step 310, in accordance with the above teachings. At step 320, the yogurt cream cheese product is agitated in the presence of an inert gas at an elevated pressure. For example, the yogurt cream cheese product can be passed through a confined space having an agitator, while being simultaneously subjected to an inert gas at an elevated pressure.

In one embodiment according to the present invention, the inert gas is provided at an initial pressure within a range of between about 150 PSI and about 240 PSI. In another embodiment according to the present invention, the inert gas is provided at an initial pressure within a range of between about 220 PSI and about 240 PSI. In yet a further embodiment according to the present invention, the pressure of the inert gas is controlled throughout the agitator in order to expose the yogurt cream cheese product to a desired pressure for a defined time as it travels through the agitator. In another embodiment according to the present invention, the inert gas is injected into the agitator at a chosen initial pressure, which is then permitted to dissipate in the region of the agitator. In one embodiment according to the present invention, the yogurt cream cheese product is exposed to a desired pressure for between about 3 seconds and about 6 seconds. In an additional embodiment according to the present invention, the yogurt cream cheese product is exposed to a desired pressure for between about 4 seconds and about 5 seconds. Although any inert gas can be used, nitrogen is the typical and most practical choice. By "inert" is meant a gas that does not cause or at least minimizes undesirable effects on the yogurt cream cheese product, its production, and the consumer.

Injection of a gas into the viscous yogurt cream cheese product under high pressure is problematic due to the extreme density mismatch of the gas and the high viscosity yogurt cream cheese. The gas diffuses into the yogurt cream cheese product. Diffusion of the gas throughout the body of yogurt cream cheese is not instantaneous even with agitation, effectively requiring gas delivery pressure above and beyond that necessary for equalizing the prevailing pressure within the body of yogurt cream cheese. This resistance to gas dispersion in the semi-solid yogurt cream cheese can be ameliorated by employing an in-line gas injection system providing controllable gas injection pressure and preferably having a relatively large bore gas delivery orifice. A mass flow controller such as, for example, a GFC-171S mass flow controller commercially available from Aalborg Instruments & Controls, Inc., 20 Corporate Drive, Orangeburg, N.Y. 10962, can be used.

In one embodiment according to the present invention, the temperature of the yogurt cream cheese product is reduced at step 340, and so maintained or further modified during step 320. For example, a scraped surface heat exchanger, such as a Waukesha Cherry-Burrell Thermutator® or Votator®, can be used to provide the needed agitation while simultaneously controlling the temperature. In one embodiment according to the present invention, the temperature of the yogurt cream cheese product is reduced to a suitable inert gas injection temperature at step 340, and is then so maintained or further reduced during step 320. This temperature reduction at step 340 increases retention of the inert gas in the yogurt cream cheese product during subsequent step 320. In the absence of such a temperature reduction before injection of the inert gas, excessive escape of the inert gas from the yogurt cream cheese product prior to or during step 320 may retard the desired whipping process and result in a product having a less whipped texture than desired. In one embodiment according to the present invention, the yogurt cream cheese product is cooled at step 340 to an inert gas injection temperature within a range of between about 65° F. and about 68° F., and agitation in the presence of the inert gas at an elevated pressure is then carried out at a temperature within a range of between about 58° F. and about 62° F. within the agitator at step 320. Using higher temperatures counteracts the effect of the pressurized gas in causing the yogurt cream cheese product to expand into whipped form and accordingly is to be avoided. If desired, however, the yogurt cream cheese product may in general be cooled to a whipping temperature within a range of between about 65° F. and about 90° F., and more preferably cooled at least to about 80° F., at step 340. A temperature within a range of between about 58° F. and about 70° F., more preferably about 68° F. or lower, may then be employed within the agitator at step 320. Either or both of steps 340 and 320 can include multiple cooling steps that reduce the yogurt cream cheese temperature in a staged, controlled manner. This cooling can be carried out, for example, with a smooth and gradual temperature reduction or in discrete steps. In one embodiment according to the present invention, step 340 is carried out immediately following completion of homogenization in step 185 or immediately following completion of acidification in step 190. For example, step 340 can be carried out in the outlet chamber of a homogenizer.

The agitation within the scraped surface heat exchanger may be controlled to a desired level in order to maintain the yogurt cream cheese product within the exchanger for an adequate time for the pressurized inert gas to act on the product. The normal operating speed of the agitator in a Waukesha Cherry-Burrell Thermutator® or Votator® may need to be reduced, for example to within a range of between about 800 and 1,000 revolutions per minute, in order to avoid excessive shear. In order to facilitate further reduction of the temperature of the yogurt cream cheese product in the course of passage through the scraped surface heat exchanger, such exchanger is equipped to withdraw heat from the product, which is then dissipated in a suitable manner. In one embodiment according to the present invention, two scraped surface heat exchangers are operated in series so that the yogurt cream cheese product is successively passed through both exchangers, which jointly cool and apply pressurized inert gas to the yogurt cream cheese product. In another embodiment according to the present invention, a Terlotherm® vertical scraped surface heat exchanger is employed. Terlotherm® machinery is commercially available from Terlet USA, 6981 North Park Drive, East Bldg., Suite 201, Pennsauken, N.J. 08109.

The resulting product indicated at 330 is a whipped yogurt cream cheese product. The texture and consistency of the yogurt cream cheese product made in accordance with one embodiment of the present invention is the same as that of ordinary whipped cream cheese. For example, the whipped yogurt cream cheese product may have a viscosity within a range of between about 500,000 centipoises and about 1,500,000 centipoises at a temperature of about 74° F.

Where it is desired to add solid adjuvants such as fruits, vegetables or nuts to the yogurt cream cheese product, they are preferably added after the whipping process is completed.

EXAMPLE 1

A batch of 1,500 pounds of pre-pasteurized heavy cream having a butterfat content of 44% was pumped into a kettle equipped with a heater and an agitator. The cream was heated with agitation to 85° F., whereupon 500 milligrams of pHage Control™ 604 cream cheese culture bacteria were added to the cream with agitation for 15 minutes. The cream was then maintained at 85° F. for 75 minutes. The butterfat content of the cream was then adjusted to 33% by weight by the addition with agitation of 195.8 pounds of nonfat dry milk and 180 pounds of water. After 15 minutes of agitation, 9.01 pounds of K6B493 stabilizer was added to the cream with agitation to thicken the mixture. The cream was then pasteurized by heating it with agitation to 165° F. and holding at that temperature for 15 minutes. The temperature of the resulting cream cheese precursor was adjusted to 130° F. Approximately 29% by weight of the protein content in this cream cheese precursor was derived from the cream; the balance being derived from the nonfat dry milk and stabilizer.

Meanwhile, yogurt was separately and simultaneously prepared. A batch of 312 pounds of condensed nonfat milk having a solids content of 33% by weight was provided. The solids content was adjusted to 20% by weight, by addition of 187 pounds of water. The condensed milk was then pasteurized by heating it with agitation to 165° F. and holding at that temperature for 15 minutes. The temperature of the condensed milk was then adjusted to 108° F., whereupon 250 milligrams of F-DVS YoFast®-10 yogurt culture bacteria were added to the condensed milk with agitation for 15 minutes. The condensed milk was then maintained at 108° F. for 6 hours. The resulting yogurt was then ready for combination with the cream cheese precursor. Next, 470 pounds of the prepared yogurt was mixed into 1,880 pounds of the cream cheese precursor with agitation. The mixture was cooled to a temperature of 125° F., and then homogenized by subjecting the mixture to a pressure of about 3,000 PSI at a temperature of 125° F. for about 5 seconds. The homogenized mixture was then acidified to a pH of about 4.5 by addition of 25 pounds of Stabilac® 12 Natural acid.

The resulting yogurt cream cheese product comprised about 25.9% by weight of butterfat; about 4.54% by weight of milk protein; about 0.0813% by weight of cholesterol; about 0.211% by weight of sodium; about 58.3% by weight of water; and about 41.7% by weight of solids. Concerning the protein content of this final product, approximately: 57% was derived from the nonfat dry milk together with the stabilizer; 23% was derived from the cream; and 20% was derived from the yogurt. The yogurt cream cheese product had a viscosity of about 1,336,000 centipoises at a temperature of about 74° F., and yielded substantially no syneresis after 15 hours at about 74° F. to about 75° F.

EXAMPLE 2

A batch of 1,335 pounds of pre-pasteurized heavy cream having a butterfat content of 44% is pumped into a kettle equipped with a heater and an agitator. The cream is heated with agitation to 85° F., whereupon 500 milligrams of pHage Control™ 604 cream cheese culture bacteria are added to the cream with agitation for 15 minutes. The cream is then maintained at 85° F. for 75 minutes. The butterfat content of the cream is then adjusted to 23.5% by weight by the addition with agitation of 244 pounds of nonfat dry milk and 765 pounds of water. After 15 minutes of agitation, 11.25 pounds of K6B493 stabilizer is added to the cream with agitation to thicken the mixture. The cream is then pasteurized by heating it with agitation to 165° F. and holding at that temperature for 15 minutes. The temperature of the resulting cream cheese precursor is adjusted to 128° F. Approximately 54% by weight of the protein content in this cream cheese precursor is derived from the cream; the balance being derived from the nonfat dry milk and stabilizer.

Yogurt is separately and simultaneously prepared in the same manner as described in Example 1. Next, 500 pounds of the prepared yogurt is mixed into 2,000 pounds of the cream cheese precursor with agitation. The mixture is cooled to a temperature of 125° F., and then homogenized by subjecting the mixture to a pressure of about 3,000 PSI at a temperature of 125° F. for about 5 seconds. The homogenized mixture is then acidified to a pH of about 4.5 by addition of 25 pounds of Stabilac® 12 Natural acid.

The resulting yogurt cream cheese product comprises about 18.74% by weight of butterfat; about 8.85% by weight of milk protein; about 0.0613% by weight of cholesterol; about 0.331% by weight of sodium; about 49.77% by weight of water; and about 50.23% by weight of solids. Concerning the protein content of this final product, approximately: 40.2% is derived from the nonfat dry milk together with the stabilizer; 47.1% is derived from the cream; and 12.7% is derived from the yogurt. The yogurt cream cheese product has a viscosity of about 1,000,000 centipoises at a temperature of about 74° F., and yields less than about 1% syneresis by weight after 15 hours at about 74° F. to about 75° F.

While the present invention has been disclosed in a presently preferred context, it will be recognized that the present teachings may be adapted to a variety of contexts consistent with this disclosure and the claims that follow. For example, the process shown in the figures and discussed above can be adapted in the spirit of the many optional parameters described, to yield a variety of products, including, for example, yogurt cream cheese, yogurt neufchatel cheese, and yogurt low-fat cream cheese.

We claim:

1. A process for making a yogurt cream cheese product comprising steps of:
   providing a milkfat fluid including butterfat;
   pasteurizing said milkfat fluid to produce a pasteurized milkfat fluid;
   providing a yogurt, and combining said yogurt with said pasteurized milkfat fluid to produce a combined precursor; and
   homogenizing and acidifying said combined precursor;
   wherein said acidification is completed within about three hours following production of said combined precursor;
   producing a yogurt cream cheese product.

2. The process of claim 1, in which said acidification is completed within about 2 hours following production of said combined precursor.

3. The process of claim 1, in which said acidification is completed within about one half hour following production of said combined precursor.

4. The process of claim 1, in which said yogurt and said pasteurized milkfat fluid are combined together at a time T1 to produce said combined precursor, and in which acidification of said combined precursor is completed at a time T2; wherein T2 is within about three hours or less following T1.

5. The process of claim 4, in which said yogurt and said pasteurized milkfat fluid are combined together at time T1 to produce a batch of said combined precursor, and in which acidification of said batch is completed at time T2; wherein T2 is within about three hours or less following T1.

6. The process of claim 1, in which said pasteurized milkfat fluid is at a temperature within a range of between about 110° F. and about 128° F. prior to said combining with said yogurt; and in which said yogurt is at a temperature within a range of between about 95° F. and about 112° F. prior to said combining with said pasteurized milkfat fluid.

7. The process of claim 1, in which said pasteurized milkfat fluid is at a temperature within a range of between about 115° F. and about 128° F. prior to said combining with said yogurt; and in which said yogurt is at a temperature within a range of between about 100° F. and about 110° F. prior to said combining with said pasteurized milkfat fluid.

8. The process of claim 1, in which said pasteurized milkfat fluid is at a temperature within a range of between about 120° F. and about 125° F. prior to said combining with said yogurt; and in which said yogurt is at a temperature within a range of between about 100° F. and about 108° F. prior to said combining with said pasteurized milkfat fluid.

9. The process of claim 1, in which said combined precursor is cooled to a temperature within a range of between about 112° F. and about 114° F. or less prior to said acidifying.

10. The process of claim 1, in which said combined precursor is cooled to a temperature of less than about 75° F. prior to said acidifying.

11. The process of claim 1, in which said pasteurized milkfat fluid and said yogurt are not reheated prior to production of said yogurt cream cheese product.

12. The process of claim 1 in which said milkfat fluid includes cream.

13. The process of claim 1 including the steps of providing culture bacteria, and culturing said milkfat fluid with said culture bacteria.

14. The process of claim 13 including the step of pasteurizing said milkfat fluid before said culture bacteria substantially digest said milkfat fluid.

15. The process of claim 13 including the step of pasteurizing said milkfat fluid within about 60 minutes to about 90 minutes after adding said culture bacteria to said milkfat fluid.

16. The process of claim 1 including the step of adding a stabilizer to said milkfat fluid.

17. The process of claim 1 in which said yogurt includes live culture bacteria.

18. The process of claim 1, in which the step of homogenizing said combined precursor is carried out at an elevated pressure.

19. The process of claim 18 in which said pressure is within a range of between about 2,000 pounds per square inch and about 4,000 pounds per square inch.

20. The process of claim 1, in which said step of acidifying said combined precursor results in a pH within a range of between about 4.1 and about 5.0.

21. The process of claim 1, in which said step of acidifying said combined precursor results in a pH within a range of between about 4.40 and about 4.50.

22. The process of claim 1, in which said yogurt cream cheese product includes a food additive, and said step of acidifying said combined precursor results in a pH within a range of between about 4.38 and about 4.48.

23. The process of claim 1, including the step of agitating said yogurt cream cheese product in the presence of an inert gas at an elevated pressure.

24. The process of claim 23, including the steps of: injecting an inert gas into said yogurt cream cheese product; and cooling said yogurt cream cheese product to an inert gas injection temperature prior to said injecting.

25. The process of claim 24, in which said inert gas injection temperature is within a range of between about 65° F. and about 68° F.

26. The process of claim 24, in which said yogurt cream cheese product is cooled to a temperature within a range of between about 58° F. and about 62° F. following said injecting.

27. The process of claim 1 in which said pasteurized milkfat fluid includes retained whey from said milkfat fluid.

28. The process of claim 1 in which said pasteurized milkfat fluid is not homogenized.

29. The process of claim 1, in which said yogurt is made by steps including:
providing milk;
pasteurizing said milk to yield pasteurized milk;
cooling said pasteurized milk to a bacteria culture temperature; and
adding live culture bacteria to said pasteurized milk; yielding yogurt.

30. The process of claim 29, in which said live culture bacteria include *Lactobacillus acidophilus, Bifidobacterium*, and *L. casei*.

31. The process of claim 1, in which said yogurt constitutes between about 10% by weight and about 40% by weight of said yogurt cream cheese product.

32. The process of claim 1, in which said milkfat fluid includes by weight about 34.5% to about 50% butterfat, about 3% to about 7% protein, and about 59% to about 42% water, with the balance constituted by other milk solids.

33. The process of claim 1, including the step of incorporating a non-digestible polysaccharide in said yogurt cream cheese product.

34. A yogurt cream cheese product made according to the process of claim 1.

35. The yogurt cream cheese product of claim 34, having less than about 1% syneresis by weight after 15 hours at a temperature within a range of between about 74° F. and about 75° F.

36. The yogurt cream cheese product of claim 34, having a viscosity within a range of between about 700,000 centipoises and about 3,000,000 centipoises at about 74° F.

37. The yogurt cream cheese product of claim 34, in which at least about 40% of the milk protein is derived from said milkfat fluid and said yogurt.

38. The yogurt cream cheese product of claim 34, in which at least about 50% of the milk protein is derived from said milkfat fluid and said yogurt.

39. A process for making a yogurt cream cheese product comprising steps of:
providing a milkfat fluid including butterfat;
pasteurizing said milkfat fluid to produce a pasteurized milkfat fluid;
providing a yogurt, and combining said yogurt with said pasteurized milkfat fluid to produce a combined precursor; and
homogenizing and acidifying said combined precursor;
wherein said combined precursor is cooled to retard bacteria activity prior to said acidifying;
producing a yogurt cream cheese product.

40. The process of claim 39, in which said combined precursor is cooled to a temperature within a range of between about 112° F. and about 114° F. or less prior to said acidifying.

41. The process of claim 39, in which said combined precursor is cooled to a temperature of less than about 75° F. prior to said acidifying.

42. The process of claim 39, in which said combined precursor is reheated to a temperature within a range of between about 118° F. and about 125° F.

43. The process of claim 39, in which said combined precursor is reheated to a temperature within a range of between about 118° F. and about 120° F.

44. A process for making a whipped yogurt cream cheese product comprising steps of:
providing a milkfat fluid including butterfat;
pasteurizing said milkfat fluid to produce a pasteurized milkfat fluid;
providing a yogurt, and combining said yogurt with said pasteurized milkfat fluid to produce a combined precursor;
homogenizing and acidifying said combined precursor to produce a yogurt cream cheese product;
injecting an inert gas into said yogurt cream cheese product, and cooling said yogurt cream cheese product to an inert gas injection temperature prior to said injecting; and
agitating said yogurt cream cheese product in the presence of said inert gas at an elevated pressure;
producing a whipped yogurt cream cheese product.

45. The process of claim 44, in which said inert gas injection temperature is within a range of between about 65° F. and about 68° F.

46. The process of claim 44, in which said yogurt cream cheese product is cooled to a temperature within a range of between about 58° F. and about 62° F. following said injecting.

47. The process of claim 39, including the step of incorporating a non-digestible polysaccharide in said yogurt cream cheese product.

48. The process of claim 44, including the step of incorporating a non-digestible polysaccharide in said yogurt cream cheese product.

49. The process of claim 33, wherein the non-digestible polysaccharide includes inulin.

* * * * *